US009146862B2

(12) United States Patent
Bobroff et al.

(10) Patent No.: US 9,146,862 B2
(45) Date of Patent: Sep. 29, 2015

(54) OPTIMIZING MEMORY USAGE ACROSS MULTIPLE GARBAGE COLLECTED COMPUTER ENVIRONMENTS

(71) Applicant: International Business Machines Corporation, Armonk, NY (US)

(72) Inventors: Norman Bobroff, Katonah, NY (US); Arun Iyengar, Yorktown Heights, NY (US); Peter Westerink, Ossining, NY (US)

(73) Assignee: International Business Machines Corporation, Armonk, NY (US)

( * ) Notice: Subject to any disclaimer, the term of this patent is extended or adjusted under 35 U.S.C. 154(b) by 245 days.

(21) Appl. No.: 13/945,516

(22) Filed: Jul. 18, 2013

(65) Prior Publication Data

US 2015/0026429 A1 Jan. 22, 2015

(51) Int. Cl.
*G06F 12/02* (2006.01)
(52) U.S. Cl.
CPC .................. *G06F 12/0253* (2013.01)
(58) Field of Classification Search
CPC .................................. G06F 12/0253
See application file for complete search history.

(56) References Cited

U.S. PATENT DOCUMENTS

| 8,583,783 | B1* | 11/2013 | Hayward et al. | 709/224 |
|---|---|---|---|---|
| 2009/0112952 | A1* | 4/2009 | Adams et al. | 707/206 |
| 2014/0143516 | A1* | 5/2014 | Dawson et al. | 711/171 |
| 2015/0026428 | A1* | 1/2015 | Bobroff et al. | 711/170 |

OTHER PUBLICATIONS

Stec, E., et al., "Turning Garbage Collection with IBM Technology for Java." IBM Systems Magazine, Sep. 2007.
IBM "AIX Extra: Using Dynamic LPAR in AIX 5L v5.2." IBM Systems Magazine, Apr. 2004.
WikiPedia "Dynamic Logical Partitioning" Apr. 4, 2013.

\* cited by examiner

*Primary Examiner* — Hiep Nguyen
(74) *Attorney, Agent, or Firm* — Fleit Gibbons Gutman Bongini & Bianco PL; Jose Gutman

(57) ABSTRACT

A method, information processing system, and computer readable storage medium, vary a maximum heap memory size for one application of a plurality of applications based on monitoring garbage collection activity levels for the plurality of applications, each application including a heap memory, and unused memory in the heap memory being reclaimed by a garbage collector.

25 Claims, 6 Drawing Sheets

OPTIMIZING MEMORY USAGE ACROSS MULTIPLE GARBAGE COLLECTED COMPUTER ENVIRONMENTS

CROSS-REFERENCE TO RELATED APPLICATION

This application is related to U.S. patent application Ser. No. 13/945,494, entitled "MEMORY USE FOR GARBAGE COLLECTED COMPUTER ENVIRONMENTS", filed on the same filing date hereof, the disclosure of which is hereby incorporated by reference in its entirety.

FIELD OF THE DISCLOSURE

The present disclosure generally relates to computer memory management, and more particularly relates to managing use of computer memory by one or more applications in a garbage-collected information processing system.

BACKGROUND OF THE DISCLOSURE

Programming languages such as Java, C++, Lisp, Smalltalk, and several scripting languages allocate memory from such an area known as the heap (or heap memory). At any given time, some parts of the heap may be in use while parts may be "free" (i.e., unused) and thus available for future allocations. In order to free memory from the heap, garbage collection is needed. A key problem with such environments is that memory overhead is a significant factor. Programmers cannot manually allocate or deallocate memory objects. They need to rely on garbage collectors (i.e., one or more garbage collectors are normally available in the operating system) to free up memory which is no longer being used. In many cases, this can result in excess memory being allocated to the heap.

Such excess heap memory being allocated to one or more applications operating in a computer system environment can create serious memory management problems for the computer system. These problems are particularly difficult to deal with in situations in which multiple applications are running on the same computer system, and the applications are all competing for memory. For example, multiple Java virtual machines (JVM) might be running on the same information processing system concurrently, competing with each other for memory (as well as other resources). The idea is to allocate memory efficiently across all applications. Memory should be properly distributed across all of the JVMs on the system. A key problem is how to allocate memory across the system for optimal performance among all of the JVMs.

Java allocates memory from an area known as the heap. In order to free memory from the heap, garbage collection is needed. The concepts of "heap" and "garbage collection" are well known, and are explained in various publications, such as see a Wikipedia article entitled "programming_language", a Wikipedia article entitled "memory management", and a Wikipedia article entitled "garbage collection", the collective contents of these articles being hereby incorporated herein by reference.

In summary, memory management is the process of managing computer memory, including mechanisms to dynamically allocate portions of memory to programs upon request and freeing it for reuse when no longer needed. Memory requests are satisfied by allocating portions from a large pool of memory referred to as "the heap", and, at any given time, some parts of the heap are in use while some are "free" (i.e., unused) and thus available for future allocations. While ideally memory should be properly distributed across all of the JVMs on the system, conventional system have failed to do this in an optimal fashion. Conventional system designs regularly struggle with how to allocate memory across the system for optimal performance among all of the JVMs, with often less than satisfactory results.

Garbage collection is a form of automatic memory management that attempts to reclaim "garbage", as referring to memory occupied by objects that are no longer in use by a program. Garbage collection is often portrayed as the opposite of manual memory management, a mechanism in which the programmer specifies which objects to deallocate and return to the memory system. Many computer languages, such as Java, C++, and several scripting languages, require garbage collection either as part of the language specification or effectively for practical implementation, while other languages, such as C, C++, were designed for use with manual memory management but have garbage collected implementations available. Still others, such as Ada, Modula-3, and C++/CLI allow both garbage collection and manual memory management to co-exist in the same application by using separate heaps, and others, such as D, are garbage collected while allowing the user to manually delete objects and disable garbage collection when speed is required.

The entity that performs garbage collection is known as the garbage collector. Garbage collectors are typically implemented in software running on a computer system. They can also be implemented using special hardware that supports the garbage collector software to aid garbage collection.

SUMMARY OF THE DISCLOSURE

According to one embodiment, a method for managing computer memory is disclosed. In a processing system including a plurality of applications wherein each application includes a heap memory and wherein unused memory in the heap memory is reclaimed by a garbage collector, a method for improving memory allocation comprises the steps of: periodically monitoring the plurality of applications for memory usage including a maximum heap memory size and a garbage collection activity level; and in response to the garbage collection activity level for an application exceeding a threshold, increasing the maximum heap memory size for the application. According to a second embodiment, a method for managing computer memory is disclosed. In a processing system including a plurality of applications wherein each application includes a heap memory and wherein unused memory in the heap memory is reclaimed by a garbage collector, a method for improving memory allocation comprises the steps of: periodically monitoring the applications for memory usage including a maximum heap memory size and a garbage collection activity level; and in response to the garbage collection activity level for an application exceeding a threshold above an average garbage collection activity level or a weighted average garbage collection activity level for the processing system, increasing the maximum heap memory size for the application.

According a third embodiment, and information processing system comprises: memory; a processor communicatively coupled to the memory; a garbage collector communicatively coupled to the processor and the memory; a system monitor communicatively coupled to the processor and the memory; a memory rebalancer communicatively coupled to the processor and the memory, wherein each of a plurality of applications while running on the information processing system including a heap memory wherein unused memory in the heap memory is reclaimed by the garbage collector, and wherein the processor, responsive to executing computer instructions, performs operations comprising: periodically monitoring the plurality of applications for memory usage including a maximum heap memory size and a garbage collection activity level; and making a decision to vary a maximum heap memory size for one application of the plurality of applications based on monitoring a distribution of garbage collection activity levels for the plurality of applications.

According to another embodiment, a computer readable storage medium comprises computer instructions which, responsive to being executed by a processor, the processor being in an information processing system comprised of a memory communicatively coupled with the processor, a garbage collector communicatively coupled to the processor and the memory, and a memory rebalancer communicatively coupled to the processor and the memory, wherein each of a plurality of applications while running on the information processing system including a heap memory wherein unused memory in the heap memory is reclaimed by the garbage collector, and wherein the processor, responsive to executing computer instructions, performs operations comprising: making a decision whether to vary a maximum heap memory size for an application of the plurality of applications based on monitoring a garbage collection activity level for the application being one of outside and inside of a hysteresis region defined by an upper threshold and a lower threshold of garbage collection activity level for a distribution of garbage collection activity levels monitored for the plurality of applications while running on the information processing system.

BRIEF DESCRIPTION OF THE DRAWINGS

The accompanying figures, in which like reference numerals refer to identical or functionally similar elements throughout the separate views, and which together with the detailed description below are incorporated in and form part of the specification, serve to further illustrate various embodiments and to explain various principles and advantages all in accordance with the present disclosure. The figures are briefly described as follows.

DETAILED DESCRIPTION

As required, various detailed embodiments are disclosed herein; however, it is to be understood that the various disclosed embodiments are merely examples, which can be embodied in various forms. Therefore, specific structural and functional details disclosed herein are not to be interpreted as limiting, but merely as a basis for the claims and as a representative basis for teaching one of ordinary skill in the art to variously employ the present disclosure in virtually any appropriately detailed structure. Further, the terms and phrases used herein are not intended to be limiting; but rather, to provide an understandable description of embodiments of the disclosure.

According to various embodiments of the present disclosure, a memory optimizer and a memory rebalancer in a computer system can automatically manage memory allocation across a plurality of Java virtual machines (JVM) to optimize memory use by the JVMs and by the operating system. While various embodiments of the present disclosure are described in terms of using Java applications and a JVM, the new and novel approach to memory management can be applied to many different types of run-time systems and to programming languages, such as Java, which use heap storage and garbage collection such as C++, Lisp, Smalltalk, and various scripting languages.

Various embodiments of the present disclosure are applicable to languages with automatic memory management and garbage collection, such as Java, Lisp, Smalltalk, C++, many scripting languages, etc. Certain embodiments of the present disclosure are applicable to languages which use garbage collection in general. For ease of exposition, various embodiments of the present disclosure will be discussed in terms of Java applications and Java virtual machines (JVM run-time systems). One of ordinary skill in the art will be able to easily apply such discussed various embodiments of the present disclosure to other languages and other run-time systems, that operate with garbage collection.

Figure 1:
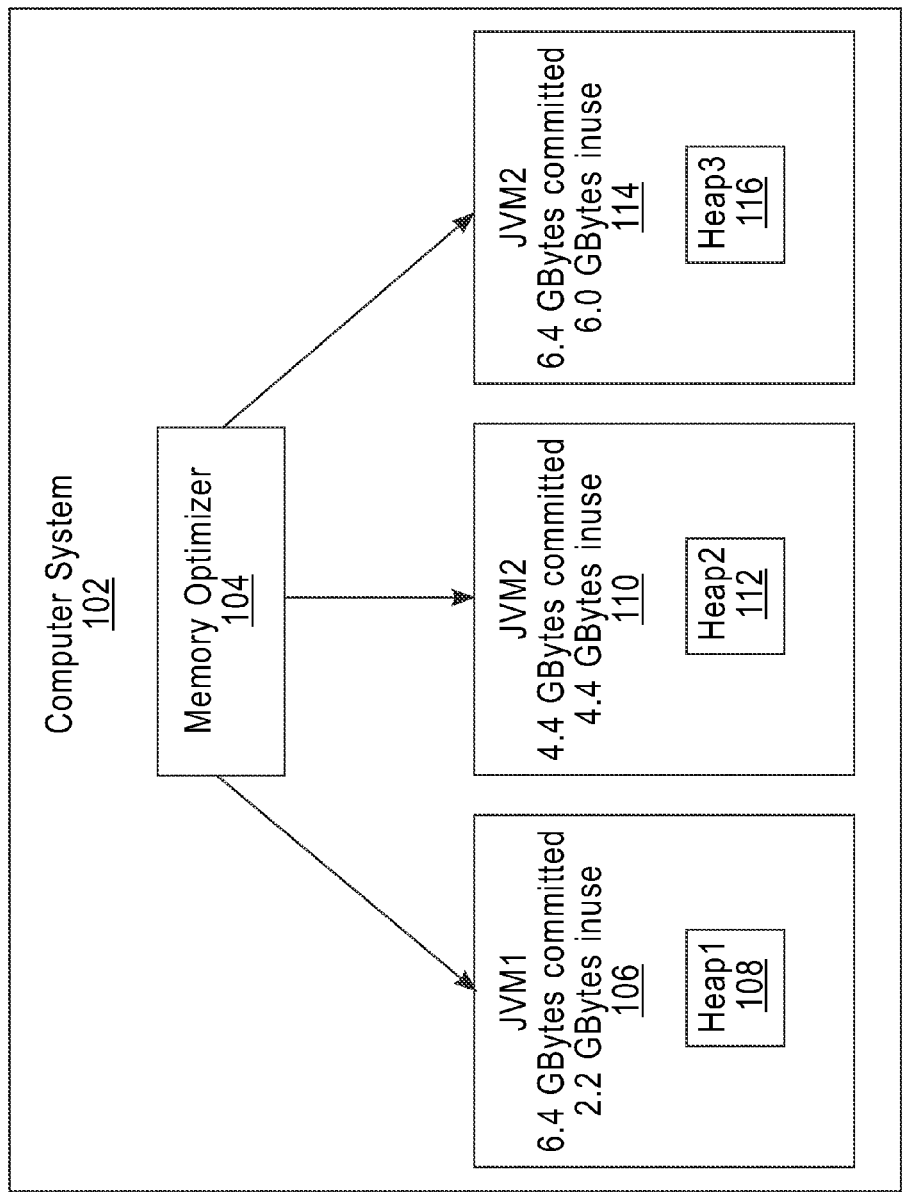
FIG. 1 is a block diagram illustrating one example of a computer system operating environment, depicting a memory optimizer for allocating memory across multiple Java Virtual Machines (JVMs), according to one embodiment of the present disclosure.

FIG. 1 depicts an example of our invention. In this figure, a memory optimizer 104 allocates memory across multiple Java Virtual Machines (JVMs).

Figure 2:
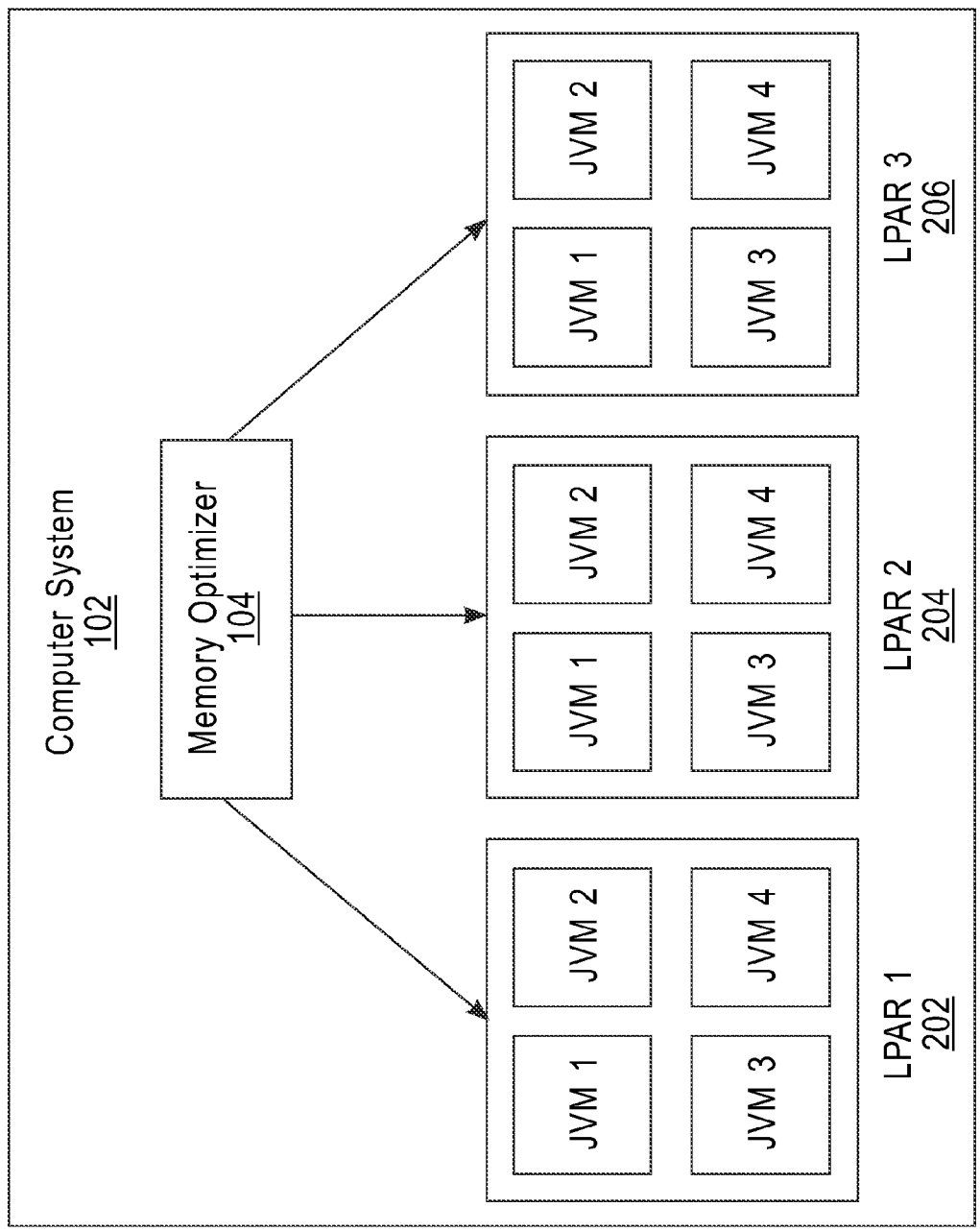
FIG. 2 is a block diagram illustrating an example of a computer systems operating environment, depicting a memory optimizer for allocating memory across multiple logical partitions (LPAR) which each include multiple Java Virtual Machines (JVMs), according to one embodiment of the present disclosure.

FIG. 2 depicts a more complex example of our invention. In this figure, there are multiple logical partitions (LPARs), and each LPAR includes multiple JVMs. The memory optimizer 104 allocates memory across all of the JVMs and all of the LPARs in the system. More information about LPARs is contained in the technical article entitled "AIX EXTRA: Using Dynamic LPAR in AIX 5L v5.2", published in the publication IBM SYSTEMS MAGAZINE, dated April 2004.

According to one example embodiment, an information processing system (or computer system) 102 comprises a plurality of JVMs running on the same operating system. A system monitor in the computer system continuously monitors each JVM for run-time performance information including, but not limited to, CPU usage, memory usage, and heap usage. The computer system, according to the present example, maintains the following memory usage parameters:

1) softmx: the maximum size the heap is allowed to grow to. Softmx is also known as the maximum heap size. After a heap size reaches the value of the parameter softmx, garbage collection would need to occur to free up heap space to allow more data to be stored on the heap. If garbage collections are taking place too frequently, the garbage collection overhead for a CPU can become significant. Therefore, to reduce CPU overhead, the value of the parameter softmx should not be too small.

2) committed: the amount of heap memory that has been committed by the operating system to the JVM.

3) inuse: the amount of heap memory in use, e.g., the amount of heap memory that the JVM is actually using.

A key feature of various embodiments of the present disclosure is that the value of parameter softmx can be varied dynamically for a JVM. A computer system, according to one embodiment, has the ability to cause a JVM to give back heap memory to an operating system. The memory which is returned to the operating system can then be used for other things, including additional heap memory for another JVM. Various examples of methods for causing a JVM to return heap memory to an operating system by lowering softmx are described in related application entitled "IMPROVING MEMORY USE FOR GARBAGE COLLECTED COMPUTER ENVIRONMENTS", Ser. No. 13/945,494, filed on the same filing date hereof, the disclosure of which is hereby incorporated by reference in its entirety.

During normal execution (i.e., not during garbage collection), the value of the parameter inuse will either rise as more heap memory is needed for an application or stay the same. Programmers cannot explicitly deallocate heap memory; however, the value of the parameter inuse can decrease as a result of garbage collection.

A memory rebalancer, according to various embodiments, monitors the run-time information across the JVMs and makes globally optimal decisions across the JVMs for allocating memory. The memory rebalancer, in various embodiments, can operate as part of the memory optimizer in optimizing memory.

The memory rebalancer has knowledge of the overhead each JVM incurs for garbage collection. The maximum heap size for a JVM is known as softmx. Once the heap size reaches softmx (and sometimes before this happens) and more memory is needed, a garbage collection needs to be triggered to free up memory.

Figure 6:
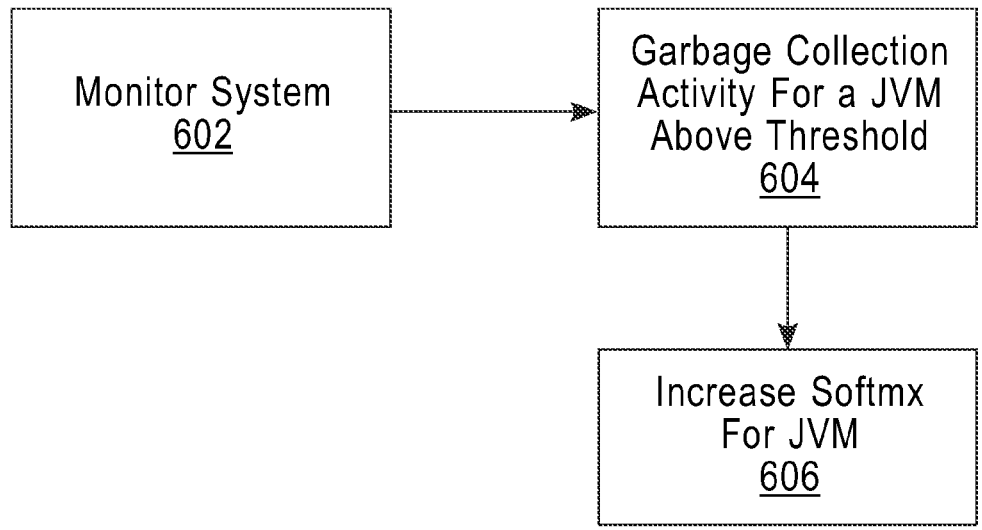
FIGS. 6 and 7 are operational flow diagrams illustrating examples of operations of a computer system, according to various embodiments of the present disclosure.

If a JVM is spending too much time in garbage collection, the memory rebalancer can raise the value of parameter softmx. An example of this process is illustrated in FIG. 6. After entering the process the computer system 102 is continuously monitored, at step 602. This monitoring may be implemented with assistance from a system monitor that continuously monitors each JVM for run-time performance information, as has been discussed above. If the computer system 102 determines, at step 604, that garbage collection activity (also referred to as "garbage collection overhead") is above a threshold value, computer system 102, at step 606, increases the maximum heap size (softmx) for the JVM. It should be noted that the monitoring taking place in step 602 may be continuous and may continue to take place while other steps are concurrently executing.

This increase in the value of parameter softmx might reduce the overhead of garbage collection by making them less frequent. The computer system 102 can also keep profile information on how garbage collection overhead varies over time with increasing softmx values. If recent increases in softmx have not reduced garbage collection overhead by a significant amount, then it may not be advisable to increase softmx further.

After a garbage collection operation by a garbage collector, committed heap memory by default will not go down, even if the garbage collector frees a considerable amount of heap storage. This means that the JVM will often maintain excess free heap storage for itself which could be returned to the operating system such as to be used by other JVMs and other applications.

Some garbage collections compact memory, which frees up large blocks of contiguous memory. Other garbage collections do not compact memory. While it is advantageous to compact memory, the drawback is that compaction involves overhead. There is less overhead to performing a garbage collection without compacting memory as compared with performing a garbage collection which compacts memory. Thus, when garbage collection is invoked, memory might be compacted during some of the invocations. For other invocations, memory might not be compacted. A garbage collection which compacts memory is referred to as a compacting garbage collection.

One key difficulty is how to automate this process discussed above. According to various embodiments of the present disclosure, as will be discussed in more detail below, a memory optimizer in the computer system tracks the frequency of garbage collections on heap memory within a JVM. When the frequency of garbage collections is high or moderate, this indicates significant heap usage. Therefore, under such conditions it is not advisable for the JVM to give up memory to the operating system. If the frequency of garbage collections is sufficiently high, it may even be desirable for the memory optimizer, or the JVM, to raise the value of the parameter softmx to allow the heap size for the JVM to grow larger. See FIG. 6 for an example of such a method. When garbage collections activity is sufficiently low, the memory optimizer in the computer system then determines whether the JVM can release memory to the operating system. See FIG. 7 for an example of such a method.

There are multiple ways in which the computer system 102 can determine the overhead consumed by garbage collection, including but not limited to any one or a combination of the following:

1) Time since the last garbage collection (or compacting garbage collection) has exceeded a threshold value;

2) Frequency of last several garbage collections (or compacting garbage collections). It is preferable to weight frequencies of more recent garbage collections higher than less recent ones;

3) Time, and/or other overhead metric, spent in recent garbage collections (or compacting garbage collection). It is preferable to weight more recent garbage collections (or compacting garbage collection) higher than less recent ones; and Note that it is also possible to normalize any of the above garbage collection or compacting garbage collection) metrics by dividing the number by a quantity such as a processing time. For example, the frequency of a garbage collection over a period of time (or compacting garbage collection) could be divided by the CPU cycles consumed by the application over that period of time.

For some JVMs, it is difficult to determine actual CPU cycles spent in garbage collection, while it may be straightforward to determine garbage collection frequencies, as well as when a garbage collection has taken place. This is a key reason why it may be easier to use garbage collection frequencies instead of garbage collection CPU overhead in optimizing memory usage.

Figure 7:
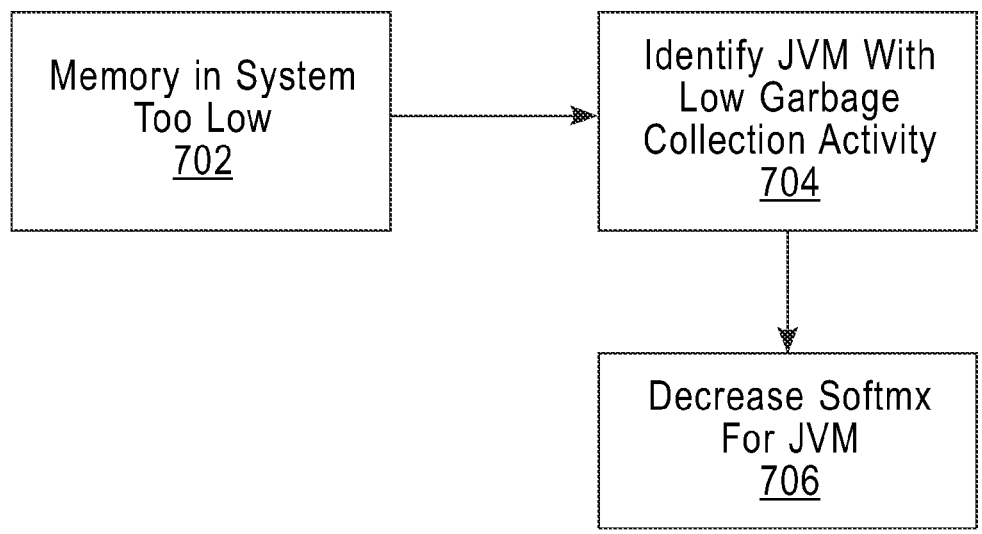

In order to increase softmx for a JVM, the operating system must have sufficient free space to give to the JVM. This means that JVMs also need to give back memory by lowering softmx when a JVM is not garbage collecting frequently. An example of such a method is illustrated in FIG. 7.

After entering the process, the computer system 102 is continuously monitored. This monitoring may be implemented with assistance from a system monitor that continuously monitors each JVM for run-time performance information, as has been discussed above. If the computer system 102 determines, at step 702, that memory in the system is too low (for example, one or more JVMs or other applications in the system may be running low on memory), then the computer system 102 identifies, at step 704, a JVM J1 with low garbage collection activity; this is done by determining that the garbage collection activity (also referred to as "garbage collection overhead") for JVM J1 is below a threshold value. The memory rebalancer, at step 706, decreases the maximum heap size (softmx) for JVM J1. Monitoring of the computer system 102 may be continuous and may continue to take place while other steps are concurrently executing.

When softmx is lowered for a JVM, the JVM can give back memory to the operating system by using a method such as the one described in related application entitled "IMPROVING MEMORY USE FOR GARBAGE COLLECTED COMPUTER ENVIRONMENTS", Ser. No. 13/945,494, filed on the same filing date hereof, the disclosure of which is hereby incorporated by reference in its entirety.

In cases in which the memory of the system is fully utilized, JVMs might take memory from the operating system at some points and give back memory to the operating system at other points. This is because the heap memory requirements for JVMs can be variable. Thus, the memory rebalancer has the ability to optimize memory use across multiple JVMs.

The memory rebalancer can consider garbage collection overhead in optimizing memory. For example, it can try to equalize garbage collection overhead across all JVMs. For a JVM which is consuming significantly less garbage collection overhead than the average, softmx can be lowered. For a JVM which is consuming significantly more garbage collection overhead than the average, softmx can be raised.

A variation on this approach would be to weight garbage collection overhead in making these decisions. For example, garbage collection overhead could be weighted by the average amount of heap space being used. As another example, a JVM might have premium service which would mean that the JVM is allowed to have a larger heap size to consume less garbage collection overhead than would otherwise be the case.

Another variation on this approach is to have either a minimum and/or a maximum softmx value for one or more JVMs. That would allow some variation in maximum heap size for a JVM, but not too much. This can prevent the heap size of a JVM from becoming too small and/or too large.

Each JVM can have a garbage collection overhead (GCO) threshold. When the garbage collection overhead for a JVM is above the GCO threshold, this indicates that too much time is being spent in garbage collection. The memory rebalancer can try to reduce garbage collection overhead for the JVM by increasing the maximum heap size for the JVM.

The memory rebalancer needs to make judicious choices in varying softmx. If softmx is varied too frequently, this can result in unnecessary overhead. In order to limit unnecessary changes to softmx, the memory rebalancer can use the following heuristics:

(1) If there is no memory pressure and the system has sufficient memory to meet the demands of all JVMs, it is not necessary to lower softmx to force a JVM to return memory to the operating system.

(2) If the system has insufficient memory to meet the demands of all JVMs, this indicates that given the amount of memory in the system, at least one of the JVMs is incurring too much garbage collection overhead. This would be indicated if the garbage collection overhead for the JVM is above the GCO threshold. The operating system does not have spare memory to give to the JVM. If the differences between garbage collection overhead and GCO threshold across all JVMs are not significant, this indicates that not much will be gained by trying to give memory from one JVM to another. The memory rebalancer will not change the allocation of memory across the JVMs. It will only try to change the allocation of memory across the JVMs if it encounters significant variations in differences between garbage collection overhead and GCO threshold for at least two JVMs.

Now consider a situation in which at least one JVM m1 is incurring too much garbage collection overhead and the operating system does not have spare memory to give to m1. Furthermore, there is at least one other JVM for which the difference between garbage collection overhead and GCO threshold is significantly lower than that for m1. In this case, it is profitable for the memory rebalancer to vary memory allocation across the JVMs.

The memory rebalancer tries to find memory for m1 from another JVM which has extra memory to give up. A JVM has extra memory to give up if its garbage collection overhead is below its garbage collection overhead threshold. If multiple JVMs have garbage collection overheads below their garbage collection overhead thresholds, then the memory rebalancer can first try to reclaim memory from those JVMs for which the differences between garbage collection overhead threshold and garbage collection overhead are highest.

It may be the case that the operating system does not have spare memory and all JVMs are incurring garbage collection overheads which are above their GCO thresholds. In this situation, the memory rebalancer will only try to change memory allocation across JVMs if there are significant differences in how much a JVM is exceeding its GCO threshold. If JVM m1 is only exceeding its garbage collection overhead threshold by a small amount and JVM m2 is exceeding its garbage collection threshold by a large amount, then the memory rebalancer can try to give some memory from m1 to m2.

When the memory rebalancer makes decisions about whether to move memory between JVMs and how much to move, it can also take into account factors such as heap size (e.g., give preference to reclaiming memory from JVMs with larger heap sizes), whether a JVM is one designated to receive premium service (if so, it is entitled to have lower garbage collection overheads), and historical profile information from a JVM. If a JVM m1 has memory to give up but historical profile information indicates that the JVM is likely to soon see an increase in memory usage, it may not be advisable for m1 to give up memory. As another example, suppose that JVMs m1 and m2 both have extra memory; the garbage collection overheads for both m1 and m2 are significantly below their respective GCO thresholds. However, historical profile information shows that if memory is taken away from m1, then garbage collection overhead for m1 will rise significantly. By contrast, if memory is taken away from m2, then garbage collection overhead for m2 will only rise slightly. In this situation, it is preferable to take memory away from m2 instead of m1.

The inventors have implemented various embodiments of the present disclosure. Experiments have demonstrated that performance degrades when heap sizes are too small. When the heap size is too small, the inventors have found that the average time to allocate a heap object can rise considerably. A key problem is determining a good metric for the increase in overhead when heap sizes are too small. The inventors have found that on certain JVMs, performance suffers once garbage collections and/or compacting garbage collections increase in frequency. By increasing heap sizes up to a certain point, the frequency of garbage collections is reduced which results in less CPU overhead for memory management. By contrast, if heap sizes are reduced, the frequency of garbage collections increase, which leads to more CPU overhead for memory management.

In order to estimate overhead for memory management, certain metrics can be used, such as m1 and m2 as follows.

m1=garbage collection frequency divided by processing time or processing cycles for operations other than garbage collection.

m2=compacting garbage collection frequency divided by processing time or processing cycles for operations other than garbage collection.

A computer system, according to one embodiment, can expand heap sizes to reduce metric values such as m1 and m2. If there are multiple JVMs all competing for heap space, then the computer system can change heap sizes in order to partially (or fully) equalize metric values across JVMs. For example, if one JVM, j1, has a significantly higher metric value than a second JVM j2, then j1's heap size can be increased, while j2's heap size can be decreased.

The computer system 102 periodically monitors JVMs to determine if heap sizes need to be adjusted. During a monitoring period, heap usage of each JVM is monitored. If there is a significant variation in metric values for JVMs, the memory rebalancer can try to reduce heap sizes for JVMs with low metric values and increase heap sizes for JVMs with high metric values.

The heap size can affect performance. If the heap size is too small, garbage collection overhead and/or the average CPU overhead to allocate heap objects can go up. Therefore, it is desirable to not make heap sizes too small.

Various embodiments of the present disclosure balance heap usage across multiple JVMs. If a particular Java Virtual Machine, JVM1, is incurring significant overhead due to a heap size being too small, the memory rebalancer can try to increase the heap size for JVM1. If the operating system does not have enough memory to give more memory to JVM1, the memory rebalancer can try to obtain heap memory for JVM1 by taking away heap memory from another JVM, such as JVM2 which has a sufficiently large heap so that memory can be taken away from JVM2 without incurring a significant performance penalty.

With reference to FIG. 1, according to one example embodiment of the present disclosure, a computer system 102 comprises a memory optimizer 104. The memory optimizer 104 allocates memory across multiple JVMs 106, 110, 114. Each JVM 106, 110, 114, is associated with a heap memory 108, 112, 116. Each JVM 106, 110, 114, is periodically monitored, such as by a system monitor, for memory and CPU information. Periodically, the memory optimizer 104 is invoked to determine if heap memory sizes for one or more JVMs 106, 110, 114, should be adjusted. It should be noted that the values for parameters committed and inuse shown in FIG. 1 are merely illustrative examples, and a wide range of other values for these parameters are possible as well.

Referring to FIG. 2, a more complex example of various embodiments of the present disclosure is shown. The computer system 102, in this example, comprises multiple logical partitions (LPARs) in which each LPAR includes multiple JVMs, as shown. The memory optimizer 104 allocates memory across multiple JVMs and multiple LPARs in the computer system 102. The memory optimizer 104 can provide extra memory to an LPAR or JVM which is running low on memory.

The memory optimizer 104 is given a total amount of heap memory that it can allocate across all JVMs 106, 110, 114. This quantity may be changing dynamically. The memory optimizer 104 determines garbage collection activity levels for each JVM. There are multiple metrics for determining garbage collection activity levels as has been discussed earlier. At least two methods which can be used are:

1) Frequency of garbage collections; and
2) Frequency of compacting garbage collections.
Other methods can be used as well.

If a garbage collection activity level for a JVM is too high (one method for determining if a garbage collection activity level for a JVM is too high would be if the metric representing the garbage collection activity level exceeds a threshold), then it is desirable to increase the heap size for the JVM. If the memory optimizer 104 has enough free memory to give to all JVMs whose garbage collection activity level is too high, then the memory optimizer 104 does not have to take away memory from one JVM to give it to another JVM. Otherwise, the memory optimizer 104 can calculate how to equitably distribute the limited heap memory across all JVMs 106, 110, 114.

The memory optimizer 104 determines an average garbage collection activity level across all JVMs 106, 110, 114. In many cases, it is preferable to compute a weighted average garbage collection activity level instead, wherein garbage collection activity levels are weighted by one or more parameters such as the heap size of the JVM, importance of the JVM, etc. For example, average garbage collection activity levels could be weighted by softmx values of the JVMs. They could also be weighted based on any one or a combination of the value of each parameter committed and inuse, other quantities correlated with heap size, etc., within the scope of the present disclosure.

The memory optimizer 104 would attempt to raise softmx for JVMs whose garbage collection activity level is significantly above the (possibly weighted) average garbage collection activity level. For example, the memory optimizer 104 could determine that a JVM's garbage collection activity level is significantly above the (possibly weighted) average garbage collection activity level if the JVM's garbage collection activity level exceeds the (possibly weighted) average garbage collection activity level by a threshold.

If insufficient free memory is available to give to the JVM, the memory optimizer 104 would lower softmx for JVMs whose garbage collection activity level is significantly below the (possibly weighted) average garbage collection activity level. When softmx (maximum heap size) is lowered for a JVM, the JVM can give back memory to the operating system by using a method such as the one described in related application entitled "IMPROVING MEMORY USE FOR GARBAGE COLLECTED COMPUTER ENVIRONMENTS", Ser. No. 13/945,494, filed on the same filing date hereof, the disclosure of which is hereby incorporated by reference in its entirety.

In order to determine if the garbage collection activity level for a JVM is significantly below the (possibly weighted) average garbage collection activity level, the memory optimizer 104 could determine if the JVM's garbage collection activity level falls below the (possibly weighted) average garbage collection activity level by an amount exceeding a threshold.

The memory optimizer 104 will often not change the softmx value for a JVM whose garbage collection activity level is close to the (possibly weighted) average garbage collection activity level.

If the memory optimizer 104 determines that Java Virtual Machine JVM1 is entitled to a larger heap size, then the amount by which softmx increases for JVM1 is correlated with the amount by which garbage collection activity level for JVM1 exceeds the (possibly weighted) average garbage collection activity level. For example, if the garbage collection activity level for JVM1 exceeds the weighted average garbage collection activity level by a factor of 3, then JVM1 is more likely to get a higher increase in softmx than a situation in which the garbage collection activity level for JVM1 exceeds the weighted average garbage collection activity level by a factor of 1.5.

Similarly, if the memory optimizer determines that Java Virtual Machine JVM2 should give up some of its heap to help out one or more JVMs which need more heap memory, then the amount by which softmx decreases for JVM2 is correlated with the amount by which garbage collection activity level for JVM2 falls below the (possibly weighted) average garbage collection activity level. For example, if the garbage collection activity level for JVM2 is ¼ the weighted average garbage collection activity level, then JVM2 is more likely to get a larger decrease in softmx than a situation in which the garbage collection activity level for JVM2 is ½ the weighted average garbage collection activity level.

Figure 3:
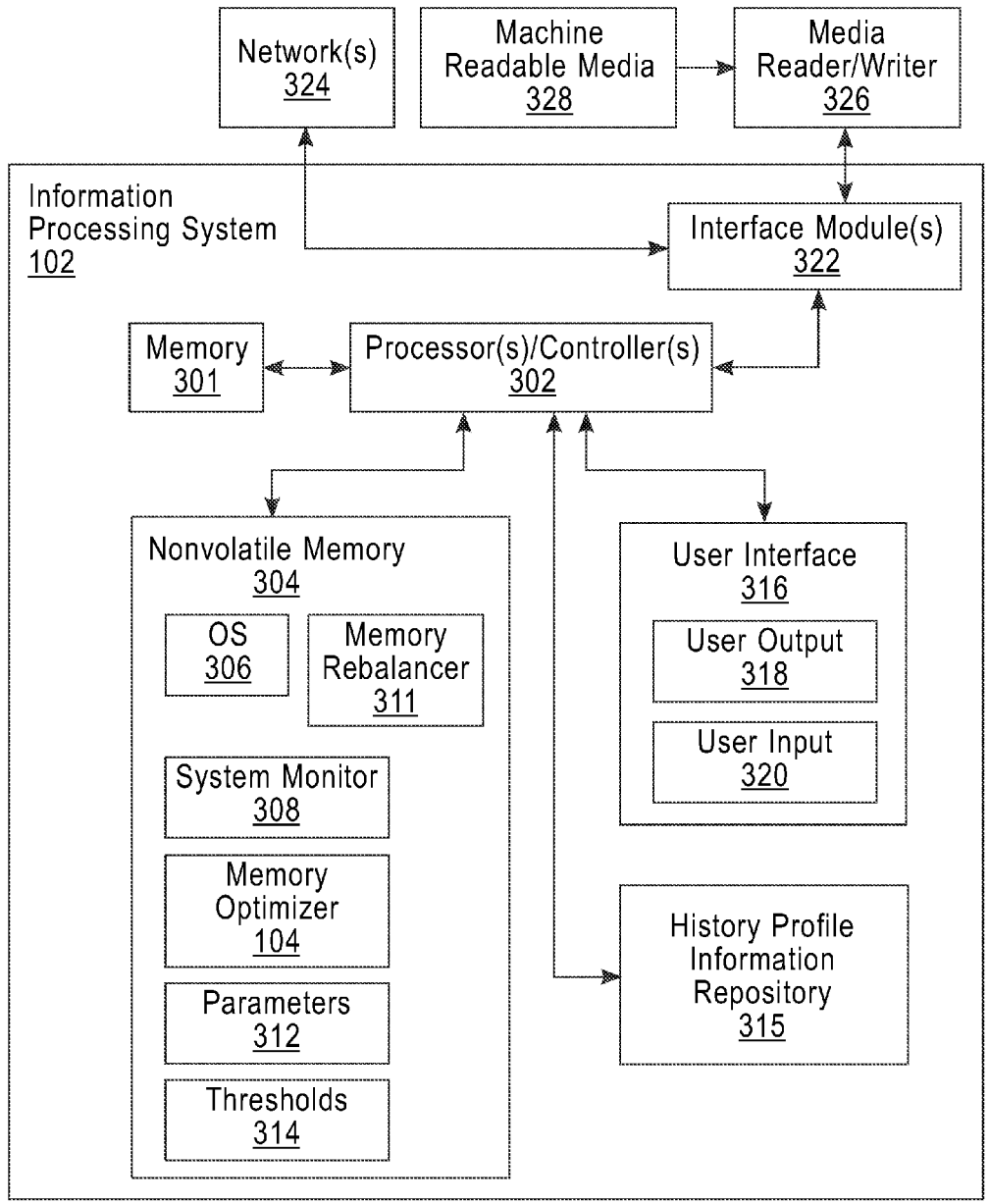
FIG. 3 is a block diagram illustrating an example computer system operating environment suitable for use with various embodiments of the present disclosure.

FIG. 3 shows a more detailed view of an alternative embodiment of a computer system 102 suitable for use with various embodiments of the present disclosure. In particular, FIG. 3 shows an information processing system (e.g., computer system) 102 that is based upon a suitably configured processing system adapted to implement one or more embodiments of the present disclosure. Similarly, any suitably configured processing system can be used as the information processing system 102 by various embodiments of the present disclosure. The information processing system 102 can be a standalone system or reside within a multi-system environment such as a parallel-distributing environment.

The information processing system (e.g., computer system) 102 includes at least one processor/controller 302. The at least one processor(s) 302 is communicatively coupled with a memory 303 and with a non-volatile memory 304. The non-volatile memory 304 can be used to store program, data, and configuration parameters, in persistent memory.

An operating system (OS) 306, according to the present example, is stored in the non-volatile memory 304 and can interoperate with the processor/controller 302 to provide OS operations in the information processing system 102. One or more memory management resources are provided by the OS 306. For example, one or more garbage collectors (not shown) can be provided in the OS 306 and made available to be invoked to perform garbage collection, or compacting garbage collection, for one or more heaps in the memory 303. Additionally, one or more timers (not shown) are provided in the OS 306 that can be used, for example, for keeping track of timed events in the information processing system 102. As one example, the time since the last garbage collection (or compacting garbage collection) can be monitored using the one or more timers (not shown) in the OS 306.

A system monitor 308, according to the present example, is stored in the non-volatile memory 304 and can interoperate with the processor/controller 302 to monitor run-time performance of the information processing system 102 and to collect run-time performance information including, but not limited to, CPU usage, memory usage, and heap usage. The collected run-time performance information is stored and updated in the non-volatile memory 304, such as in the parameters memory 312.

A memory optimizer 104, according to the present example, is stored in the non-volatile memory 304 and can interoperate with the processor/controller 302 to optimize memory management operations in the information processing system 102. Various of the operations performed with the memory optimizer 104 are discussed above with reference to the operational processing sequences illustrated in FIGS. 6 and 7.

The non-volatile memory 304 includes a memory rebalancer 311. The memory rebalancer 311 interoperates with the processor/controller 302 to allocate memory across multiple JVMs that are located, according to the present example, in the memory 301. The memory rebalancer 311 has knowledge of the garbage collection overhead incurred by each JVM. If a JVM is spending too much time in garbage collection, the memory rebalancer 311 can raise the maximum heap memory size for the JVM, which might reduce the overhead of garbage collection for that JVM by making garbage collection less frequent.

The various parameters stored in the parameters memory 312 in the non-volatile memory 304, may include a set of thresholds 314 stored in the non-volatile memory 304. Each of the thresholds (also referred to as "threshold values") 314 stores a threshold value that can be monitored and updated by the at least one processor/controller 302.

The processor/controller 302 is communicatively coupled with a history profile repository 315. The history profile repository 315 maintains information on how garbage collection overhead varies for individual JVMs with changes in maximum heap memory size for the JVMs and with respect to other performance parameters maintained for the JVMs. The memory rebalancer 311 can refer to the information in the history profile repository 315 to make its decisions on how to allocate memory to the particular JVM as well as to allocate memory to multiple JVMs that are competing for memory in the computer system 102. The memory rebalance 311 also makes its decisions and allocates memory between JVMs in the computer system 102.

The at least one processor/controller 302 is communicatively coupled with a user interface 316 which includes a user output interface 318 and a user input interface 320. The user interface 316 provides the user input interface 320 for receiving user input communication from a user of the information processing system 102. The user interface 316 provides the user output interface 318 for providing communication to a user of the information processing system 102

The user output interface 318 may include one or more display devices to display information to a user of the system 102. A display device (not shown) can include a monochrome or color Liquid Crystal Display (LCD), Organic Light Emitting Diode (OLED), or other suitable display technology for conveying image information (e.g., text, graphics, icons, etc.) to a user of the information processing system 102. A display device, according to certain embodiments, comprises a graphical user interface (GUI). A display device can include, according to certain embodiments, touch screen technology, e.g., a touchscreen display, which also serves as a user input interface 320 for detecting user input (e.g., touch of a user's finger or of a stylus). One or more speakers in the user output interface 318 can provide audible information to the user, and one or more indicators can provide indication of certain conditions of the computer system 102 to the user. The indicators can be visible, audible, or tactile, thereby providing necessary indication information to the user of the information processing system 102.

The user input interface 320 may include one or more keyboards, keypads, mouse input device, track pad, and other similar user input devices. A microphone is included in the user input interface 320, according to various embodiments, as an audio input device that can receive audible signals from a user. The audible signals can be digitized and processed by audio processing circuits coupled to the processor/controller 302 for voice recognition applications such as for the information processing system 102 to receive data and commands as user input from a user One or more input/output interface modules 322 are communicatively coupled with the processor/controller 302. In this way, the information processing system 102 is able to communicate with other processing systems and devices. For example, the processor/controller 302 is communicatively coupled with interface module(s) 322 that communicatively couple the information processing system 102 with external networks 324 and with a media reader/writer 326. The external networks 324 can include any one or a combination of wired, wireless, local area, and wide area networks.

The media reader/writer 326 can interoperate with the processor/controller 302 to read and write machine (computer) readable media 328 that may be communicatively coupled with the media reader/writer 326. Computer readable media 328, which in the present example comprise a form of computer readable storage medium, may be coupled with the media reader/writer 326 to provide information via the interface module(s) 322 to-from the processor/controller 302 of the information processing system 102. For example, data, configuration parameters, and instructions for the processor/controller 302 may be provided via the computer readable media 328 to the information processing system 102.

The interface module(s) 322 can also connect, for example, mass storage devices to the information processing system 102. One specific type of data storage device is an optical drive such as a CD/DVD drive, which may be used to store data to and read data from a computer readable storage medium such as, but not limited to, a CD/DVD device. Another type of data storage device is a data storage device configured to support, for example, NTFS type file system operations.

Although only one CPU (processor/controller) 302 is illustrated for computer system 102, computer systems with multiple CPUs (processors/controllers) 302 can be used equally effectively. Various embodiments of the present disclosure further incorporate interfaces that each includes separate, fully programmed processors that are used to off-load processing from the CPU 302.

An operating system 306 included in the nonvolatile memory 304 is a suitable multitasking operating system such as any of the operating systems Linux, UNIX, Windows, and Windows Server based operating systems, which optionally may also comprise a multi-processing operating system. Various embodiments of the present disclosure are able to use any other suitable operating system. Some embodiments of the present disclosure utilize architectures, such as an object oriented framework mechanism, that allows instructions of the components of operating system to be executed on any processor/controller 302 located within the information processing system 102. Various embodiments of the present disclosure are able to be adapted to work with any data communications connections including present day analog and/or digital techniques or via a future networking mechanism.

Figure 4:
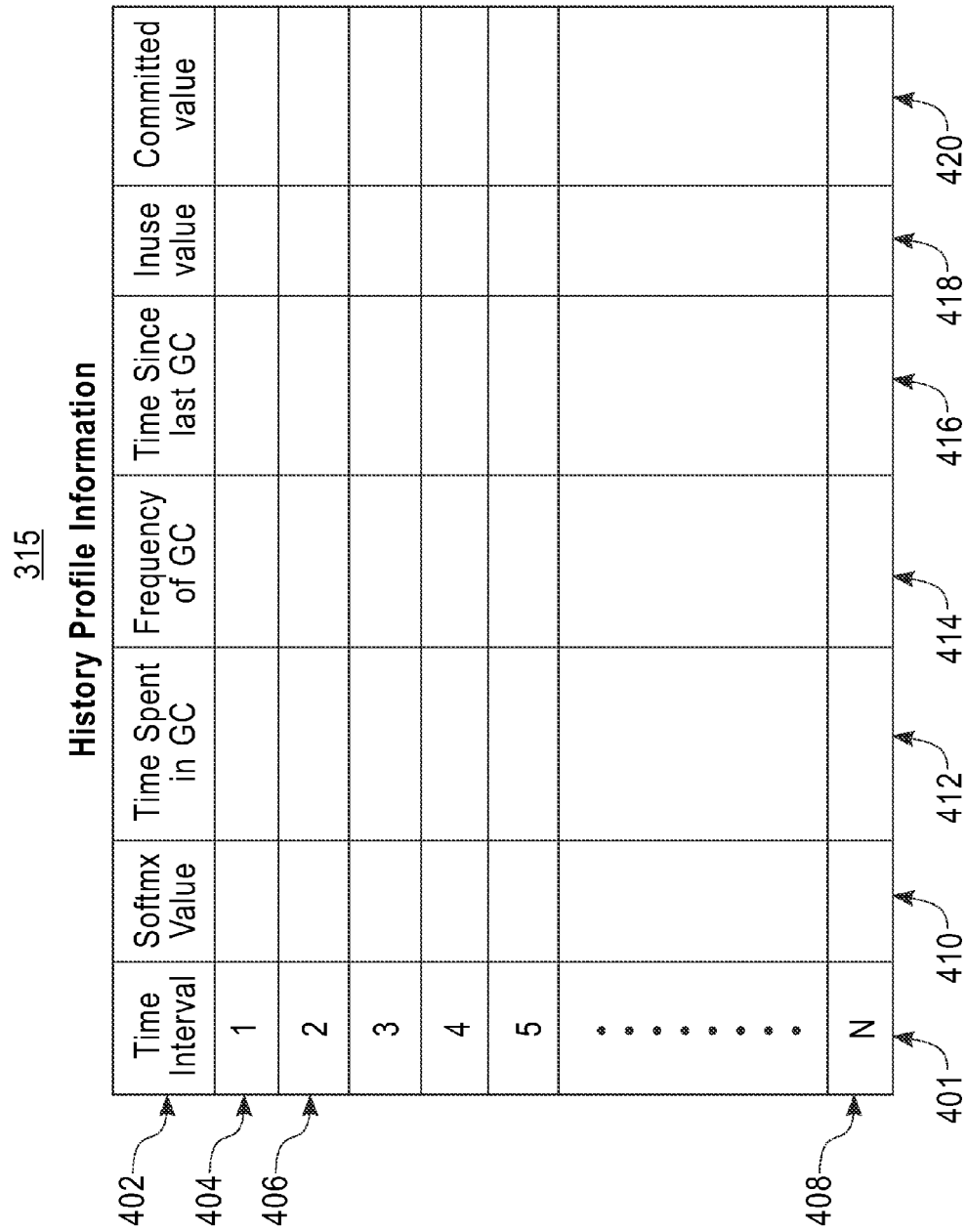
FIG. 4 is a block diagram showing a more detailed view of the history profile information repository shown in FIG. 3.

FIG. 4 illustrates an example of the history profile information repository 315, as shown in FIG. 3, according to various embodiments of the present disclosure. For each JVM, history profile information 315 is maintained organized, in this example, by the types of information identified in the top row 402. The first column 401 shows the time intervals for which history profile information is maintained for a particular JVM. For example, as shown, a first time interval 404 maintains values for the various types of history profile information that are maintained for the particular JVM. A second time interval 406 maintains a second set of history profile information for the JVM, and further time intervals continuing up to an Nth time interval 408 that also maintains a set of history profile information for the JVM. For each time interval 401, the softmx parameter value 410 is stored in the history profile information 315. The amount of time spent by the JVM in garbage collection is also stored as a value 412 in the history profile information 315 for the JVM. The frequency of garbage collection 414 is stored for each time interval in the history profile information 315 for the JVM. The time since a last garbage collection was performed 416 for the JVM is stored in the history profile information 315 for the JVM. The inuse parameter value 418 is stored for each time interval. The committed parameter value 420 is stored for each time interval in the history profile information 315. Other information (not shown) may also be stored for each time interval in the history profile information 315 for the JVM.

According to the present example, the system monitor 308 collects the information for each time interval and stores the information in the history profile information repository 315 for each JVM. In this way, the history profile information repository 315 maintains information for each JVM over several time intervals such that the memory rebalance 311 can refer to this information and make decisions regarding allocating memory to each of multiple JVMs in the computer system 102.

Figure 5:
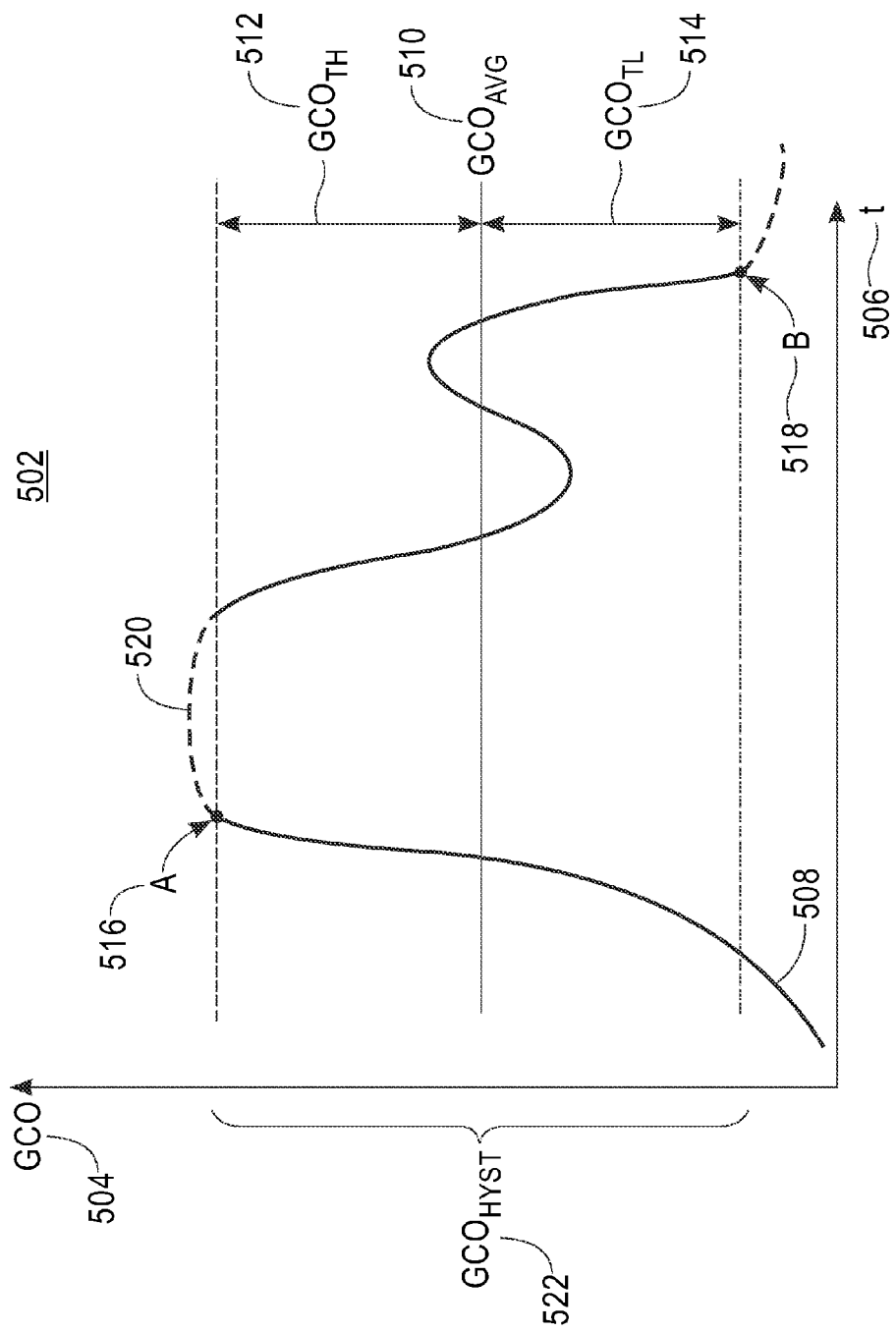
FIG. 5 is a graph chart illustrating one example of various levels of garbage collection overhead for a computer system graphed over time. The graph chart is used to help describe various embodiments of the present disclosure.

FIG. 5 illustrates with a graph 502 one example of how the memory rebalance 311 can consider garbage collection overhead for multiple JVMs to optimize memory allocation to each of the JVMs to attempt to equalize garbage collection overhead across all JVMs. The graph 502 shows garbage collection overhead 504 over time 506 for a particular JVM. The time 506 can be tracked by time intervals with information stored in the history profile information repository 315 for the particular JVM. Garbage collection overhead for the particular JVM is shown with the line 508. The memory rebalance 311 also can track average garbage collection overhead 510 for the multiple JVMs that are competing for memory in the computer system 102. The average garbage collection overhead for the set of JVMs in the computer system 102 is shown by line 510.

A first threshold 512 is maintained in the thresholds 314 in the non-volatile memory 304 to determine when the garbage collection overhead is high for each JVM. A second threshold 514 is maintained in the thresholds 314 in the non-volatile memory 304 to determine when garbage collection overhead is low for the particular JVM. These two threshold values 512, 514 do not necessarily have to equal each other. Each of the two thresholds 512, 514 can vary from a value of 0 to an absolute value that can be determined by the performance criteria assigned to 1 or more JVMs in the set of JVMs in the computer system 102.

When garbage collection overhead reaches the high garbage collection overhead threshold 512 above the average garbage collection overhead 510 for the set of JVMs, such as shown at point A 516, the memory rebalance 311 can determine that the garbage collection overhead of the particular JVM may be too high. While the garbage collection overhead of the particular JVM is above the high threshold 512 as illustrated by the dashed line 520, the memory rebalance 311 may attempt to increase the maximum memory size for the particular JVM to mitigate and attempt to reduce the amount of garbage collection overhead for the particular JVM.

On the other hand, when the garbage collection overhead of the particular JVM drops below a low garbage collection overhead threshold 514 below the average garbage collection overhead 510 for the set of JVMs, such as shown by point B 518, the heap memory rebalancer 311 may reduce the maximum memory size for the particular JVM, since the garbage collection overhead for the particular JVM is very low and therefore the JVM may not need so much heap memory to operate.

The region between the high garbage collection overhead 512 and the low garbage collection overhead 514 defines a hysteresis region 522 for garbage collection overhead. That is, the memory rebalancer 311, according to the present example, does not attempt to change the amount of maximum heap memory allocated to the particular JVM. In this way, the memory rebalancer 311 only takes action when the garbage collection overhead for the JVM reaches the high garbage collection overhead threshold 312 such as indicated at point A 516.

Similarly, the memory rebalancer 311 only takes action to release heap memory from the JVM at point B 518. In this way, the memory rebalancer 311 tends to keep the garbage collection overhead for each and every member of the set of JVMs to within the hysteresis region 522. In summary, the memory rebalancer 311 makes a decision whether to vary a maximum heap memory size for one application of a plurality of applications based on monitoring a garbage collection activity level for the application being one of outside and inside of a hysteresis region defined by an upper threshold and a lower threshold of garbage collection activity level for a distribution of garbage collection activity levels monitored for the plurality of applications while running on the information processing system. The memory rebalancer 311 makes a decision to vary a maximum heap memory size for an application of the plurality of applications based on monitoring a garbage collection activity level for the application being outside of the hysteresis region. The memory rebalancer 311 makes a decision to not vary a maximum heap memory size for the application based on monitoring a garbage collection activity level for the application being inside of the hysteresis region. This is only one example of how the memory rebalancer 311 may allocate memory to one or more JVMs in a set of JVMs in a computer system 102.

As will be appreciated by one of ordinary skill in the art, aspects of the present disclosure may be embodied as a system, method, or computer program product. Accordingly, aspects of the present disclosure may take the form of an entirely hardware embodiment, an entirely software embodiment (including firmware, resident software, micro-code, etc.) or an embodiment combining software and hardware aspects, that may each generally be referred to herein as a "circuit," "module" or "system." Furthermore, aspects of the present disclosure may take the form of a computer program product embodied in one or more computer readable storage medium(s) having computer readable program code embodied thereon.

Any combination of one or more computer readable medium(s) may be utilized. The computer readable medium may be a computer readable signal medium or alternatively a computer readable storage medium.

A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, solid-state memory, a memory card or other package that houses one or more memories, a random access memory (RAM), other re-writable (volatile) memories, a read-only memory (ROM), an erasable programmable read-only memory (EPROM or Flash memory), an optical fiber, a portable compact disc read-only memory (CD-ROM), an optical storage device, a magnetic storage device, a magneto-optical medium such as a disk or tape, other tangible media which can be used to store information, or any suitable combination of the foregoing. In the context of this document, a computer readable storage medium may be any tangible medium (i.e., any computer readable medium that is not a computer readable signal medium) and that can embody, contain, and/or store, a program for use by or in connection with an instruction execution processing system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution processing system, apparatus, or device. Program code embodied on a computer readable signal medium may be transmitted using any appropriate medium, including but not limited to wireless, wireline, optical fiber cable, RF, microwave, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The flowcharts and block diagrams in the figures illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Aspects of the present disclosure are described with reference to flowchart illustrations and/or block diagrams of methods, apparatus (systems) and computer program products according to various embodiments of the disclosure. It will be understood that one or more blocks of the flowchart illustrations and/or block diagrams, and combinations of blocks in the flowchart illustrations and/or block diagrams, can be implemented by computer program instructions. These computer program instructions may be provided to one or more processors, to a special purpose computer, or to other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner. Instructions stored in a computer readable storage medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

In accordance with various embodiments, methods described herein are intended for operation as software programs running on a computer processor. Furthermore, software implementations can include, but are not limited to, distributed processing or component/object distributed processing, parallel processing, or virtual machine processing and can also be constructed to implement the methods described herein.

The terms program, software application, application, and the like, as used herein, are defined as one or more sequences of instructions designed for execution on a processing system. A program, computer program, application, or software application, may include a subroutine, a function, a procedure, an object method, an object implementation, an executable application, an applet, a servlet, a source code, an object code, a shared library/dynamic load library and/or other sequence of instructions designed for execution on a processing system.

While the computer readable media 328 is shown in the current example embodiment as a single computer readable storage medium, the term "computer readable storage medium" should be taken to include a single medium or multiple media (e.g., a centralized or distributed database, and/or associated caches and servers) that store the one or more sets of instructions. The term "computer-readable storage medium" shall include any non-transitory medium that is capable of storing or encoding a set of instructions for execution by the machine and that cause the machine to perform any one or more of the methods of the subject disclosure.

Although the present specification may describe components and functions implemented in the embodiments with reference to particular standards and protocols, the disclosure is not limited to such standards and protocols. Each of the standards represent examples of the state of the art. Such standards are from time-to-time superseded by faster or more efficient equivalents having essentially the same functions.

The illustrations of examples described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement calculated to achieve the same purpose may be substituted for the specific embodiments shown. The examples herein are intended to cover any and all adaptations or variations of various embodiments. Combinations of the above embodiments, and other embodiments not specifically described herein, are contemplated herein.

The Abstract is provided with the understanding that it is not intended be used to interpret or limit the scope or meaning of the claims. In addition, in the foregoing Detailed Description, various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. Plural and singular terms are the same unless expressly stated otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The term "another", as used herein, is defined as at least a second or more. The terms "including" and "having," as used herein, are defined as comprising (i.e., open language). The term "coupled," as used herein, is defined as "connected," although not necessarily directly, and not necessarily mechanically. "Communicatively coupled" refers to coupling of components such that these components are able to communicate with one another through, for example, wired, wireless or other communications media. The term "communicatively coupled" or "communicatively coupling" includes, but is not limited to, communicating electronic control signals by which one element may direct or control another. The term "configured to" describes hardware, software or a combination of hardware and software that is adapted to, set up, arranged, built, composed, constructed, designed or that has any combination of these characteristics to carry out a given function. The term "adapted to" describes hardware, software or a combination of hardware and software that is capable of, able to accommodate, to make, or that is suitable to carry out a given function.

The terms "controller", "computer", "processor", "server", "client", "computer system", "computing system", "personal computing system", "processing system", or "information processing system", describe examples of a suitably configured processing system adapted to implement one or more embodiments herein. Any suitably configured processing system is similarly able to be used by embodiments herein, for example and not for limitation, a personal computer, a laptop computer, a tablet computer, a smart phone, a personal digital assistant, a workstation, or the like. A processing system may include one or more processing systems or processors. A processing system can be realized in a centralized fashion in one processing system or in a distributed fashion where different elements are spread across several interconnected processing systems.

The terms "heap" or "heap memory" are intended to broadly refer to the memory area managed using garbage collection and is not specific to the Java programming language or specific to any other programming language. The term "run-time system" in the context of the present disclosure is intended to broadly refer to a run-time operating environment or platform for executing a compatible application thereon, and which executes the application on a processing system. Optionally, the run-time system executes the application in coordination with an operating system on a processing system. The application may, but not necessarily, include the run-time system. For example, and not for limitation, a Java application may execute on a Java Virtual Machine run-time system.

The corresponding structures, materials, acts, and equivalents of all means or step plus function elements in the claims below are intended to include any structure, material, or act for performing the function in combination with other claimed elements as specifically claimed. The description herein has been presented for purposes of illustration and description, but is not intended to be exhaustive or limited to the examples in the form disclosed. Many modifications and variations will be apparent to those of ordinary skill in the art without departing from the scope of the disclosure presented or claimed. The disclosed embodiments were chosen and described in order to explain the principles of the embodiments and the practical application, and to enable others of ordinary skill in the art to understand the various embodiments with various modifications as are suited to the particular use contemplated. It is intended that the appended claims below cover any and all such applications, modifications, and variations within the scope of the embodiments.

What is claimed is:

1. In a system comprised of a plurality of applications wherein each application includes a heap memory wherein unused memory in the heap memory is reclaimed by a garbage collector, a method for improving memory allocation comprising the steps of:
periodically monitoring the plurality of applications for memory usage including a maximum heap memory size and a garbage collection activity level; and
in response to the garbage collection activity level for an application exceeding a threshold, increasing the maximum heap memory size for the application.

2. The method of claim 1, further comprising the step of:
in response to the garbage collection activity level for an application falling below a threshold, reducing the maximum heap memory size for the application.

3. The method of claim 1, further comprising the step of:
in response to the garbage collection activity level for an application falling below a threshold and free memory in the system falling below a threshold, reducing the maximum heap memory size for the application.

4. The method of claim 1, further comprising the step of:
making a decision to vary a maximum heap memory size for an application based on a distribution of garbage collection activity levels for a plurality of applications.

5. The method of claim 4, further comprising the step of:
increasing a maximum heap memory size for an application with a garbage collection activity level significantly above a mean for the distribution.

6. The method of claim 4, further comprising the step of:
decreasing a maximum heap memory size for an application with a garbage collection activity level significantly below a mean for the distribution.

7. The method of claim 1, in which a garbage collection activity level of an application is weighted by a numerical value.

8. The method of claim 7, in which the numerical value is correlated with heap memory size, total memory size, priority, or service level associated with an application.

9. The method of claim 1, further comprising the step of:
making a decision to vary a maximum heap memory size for an application based on historical profile information.

10. The method of claim 9, further comprising the step of:
making a decision to vary a maximum heap memory size for an application based on analyzing historical profile information to determine how much garbage collection activity levels vary with heap size.

11. The method of claim 1, further comprising the step of:
making a decision to vary a maximum heap memory size for an application based on analyzing historical profile information to predict memory size requirements for the application in the future.

12. The method of claim 1, in which at least one application corresponds to at least one Java virtual machine.

13. The method of claim 1, in which a garbage collection activity level of an application is determined by considering a frequency of garbage collections or a frequency of compacting garbage collections.

14. The method of claim 1, in which a garbage collection activity level of an application is determined by considering a frequency of garbage collections or a frequency of compacting garbage collections divided by a processing time associated with the application.

15. In a system comprised of a plurality of applications wherein each application includes a heap memory, and wherein unused memory in the heap memory is reclaimed by a garbage collector, a method for improving memory allocation comprising the steps of:
periodically monitoring the applications for memory usage including a maximum heap memory size and a garbage collection activity level; and
in response to the garbage collection activity level for an application exceeding a threshold above an average garbage collection activity level or a weighted average garbage collection activity level for the system, increasing the maximum heap memory size for the application.

16. The method of claim 15, further comprising the step of:
in response to the garbage collection activity level for a second application falling below an average garbage collection activity level or a weighted average garbage collection activity level for the system by more than a threshold, decreasing the maximum heap memory size for the second application.

17. The method of claim 16, in which an amount by which the maximum heap memory size for the second application is decreased is correlated with an amount by which the average garbage collection activity level or weighted average garbage collection activity level for the system exceeds the garbage collection activity level for the application.

18. The method of claim 15, in which an amount by which the maximum heap memory size for the application is increased is correlated with an amount by which the garbage collection activity level for the application exceeds the average garbage collection activity level or weighted average garbage collection activity level for the system.

19. The method of claim 15, in which the weighted average garbage collection activity level for the system comprises an average of a plurality of garbage collection activity levels weighted by heap memory sizes or maximum heap memory sizes.

20. The method of claim 15, in which at least one application corresponds to at least one Java virtual machine.

21. The method of claim 15, in which a garbage collection activity level of an application is determined by considering a frequency of garbage collections or a frequency of compacting garbage collections.

22. An information processing system comprising:
   a memory;
   a processor communicatively coupled to the memory;
   a garbage collector communicatively coupled to the processor and the memory;
   a system monitor communicatively coupled to the processor and the memory;
   a memory rebalancer communicatively coupled to the processor and the memory, wherein each of a plurality of applications while running on the information processing system including a heap memory wherein unused memory in the heap memory is reclaimed by the garbage collector, and wherein the processor, responsive to executing computer instructions, performs operations comprising:
      periodically monitoring the plurality of applications for memory usage including a maximum heap memory size and a garbage collection activity level; and
      making a decision to vary a maximum heap memory size for one application of the plurality of applications based on monitoring a distribution of garbage collection activity levels for the plurality of applications.

23. The information processing system of claim 22, wherein the processor, responsive to executing the computer instructions, performs operations comprising:
   making a decision to vary a maximum heap memory size for an application of the plurality of applications based on monitoring a garbage collection activity level for the application being outside of a hysteresis region defined by an upper threshold and a lower threshold of garbage collection activity level for the distribution of garbage collection activity levels for the plurality of applications.

24. The information processing system of claim 23, wherein the processor, responsive to executing the computer instructions, performs operations comprising:
   making a decision to not vary a maximum heap memory size for the application based on monitoring a garbage collection activity level for the application being inside of the hysteresis region.

25. A computer readable storage medium, comprising computer instructions which, responsive to being executed by a processor, the processor being in an information processing system comprised of a memory communicatively coupled with the processor, a garbage collector communicatively coupled to the processor and the memory, and a memory rebalancer communicatively coupled to the processor and the memory, wherein each of a plurality of applications while running on the information processing system including a heap memory wherein unused memory in the heap memory is reclaimed by the garbage collector, and wherein the processor, responsive to executing computer instructions, performs operations comprising:
   making a decision whether to vary a maximum heap memory size for an application of the plurality of applications based on monitoring a garbage collection activity level for the application being one of outside and inside of a hysteresis region defined by an upper threshold and a lower threshold of garbage collection activity level for a distribution of garbage collection activity levels monitored for the plurality of applications while running on the information processing system.

* * * * *